_United States Patent Office_

3,441,114
Patented Apr. 29, 1969

1

3,441,114
VEHICLE TRANSMISSION AND CONTROLS THEREFOR
Pietro Pensa, Como, Italy, assignor to Massey-Ferguson Services, N.V., Curacao, Netherlands Antilles
Filed Nov. 15, 1966, Ser. No. 594,570
Claims priority, application Italy, Nov. 20, 1965, 25,812/65
Int. Cl. F16h *57/06;* F16d *13/52*
U.S. Cl. 192—4                             4 Claims

ABSTRACT OF THE DISCLOSURE

A forward-reverse transmission having a forward clutch, a reverse clutch and an output shaft brake. Control for the transmission includes a pair of valves in series, the first valve operating to either transmit a modulated variable pressure to the brake or a non-modulated pressure to a second valve which can be selected to direct pressure either to the forward or the reverse clutch.

---

The present invention relates to vehicles and to transmissions especially for crawler vehicles and to controls including brakes therefor.

According to the present invention a vehicle transmission includes an input shaft which is drivingly connected with a pair of similar selectively operable forward-stop-and-reverse drive trains, one for each traction side of the vehicle, and connected thereto through separate left and right hand output shafts. Each such drive train includes a fluid operated forward clutch, a fluid operated reverse clutch and a fluid operated brake under the control of manually operable valve means.

Preferably also said valve means comprises a brake valve and a clutch valve and on which said brake valve receives pressure fluid from a source and normally discharges it to the clutch valve but is operative to divert it to an actuator for said brake, and in which said clutch valve rceives pressure fluid from said brake valve and normally discharges it freely to exhaust but is operative to divert it to one or other actuators for said clutches and includes a variable relief valve for modulating the pressure applied to said brake, the arrangement being that a brake control member is provided, initial movement of which diverts flow of pressure fluid away from said clutch valve to said brake and subsequent movement of which progressively increases the pressure at which the pressure relief valve spills thereby increasing the pressure applied to said brake.

According also to the present invention a vehicle comprises a body, ground engaging driving members supporting said body, a power plant supported in or by said body, a transmission drivingly connected to said power plant and including a set of change speed gears, a reversing gear drivingly connected to said change speed gear set said reversing gear comprising transmission elements including a forward clutch for establishing a forward drive for ground engaging driving members, transmission elements including a reverse clutch for establishing a reverse drive for ground engaging driving members, and brake means operative to brake the vehicle irrespective of the direction of drive, and valve means operative to engage either said forward clutch or said reverse clutch and to disengage both of said clutch when said brake is applied, both said brakes and clutches being full power operated from a common fluid pressure source.

Further according to the invention a transmission control for a vehicle comprises a source of pressurized fluid, a brake valve, a clutch valve, a manual control or pedal

2 members therefor, said brake valve comprising a four-port, two position valve adapted to receive pressure fluid from the source and to direct it alternatively to a brake actuator or to said clutch valve, said clutch valve comprising a four-port, three-position valve adapted to receive pressure fluid from said brake valve and to direct it to one or another of two fluid pressure clutch actuators or to exhaust.

Preferably the transmission control additionally comprises a variable pressure relief valve sensitive to brake actuator pressure and movable in a range of movement of the brake control member to modulate the brakes by varying the spill pressure of the relief valve.

The invention will now be described with reference to the accompanying drawings of which:

The reversible gear described can form part of a transmission for a crawler tractor and in particular constitutes the drive of one of the crawler tracks.

Figure 1:
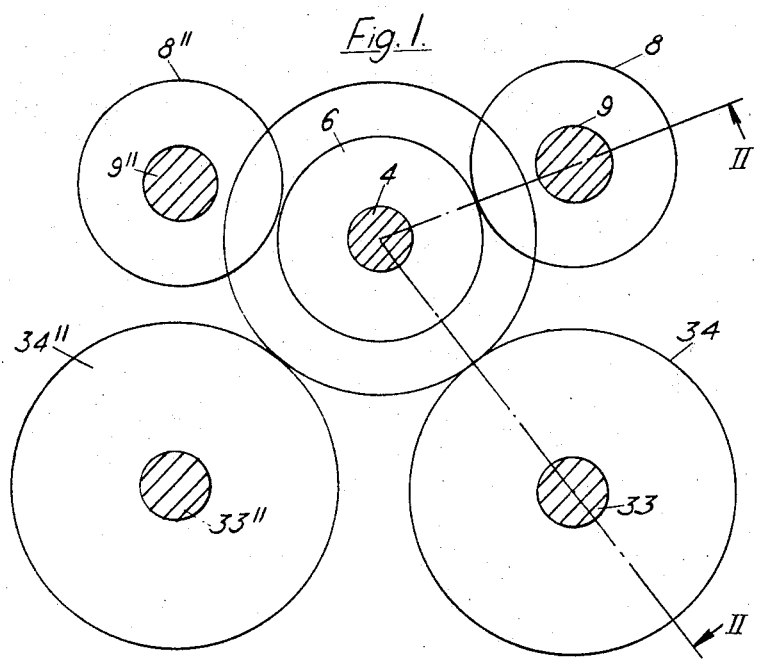
FIG. 1 is a transverse section 1—1 of the reversing gear in FIG. 2.

FIG. 1 shows an outer casing 1 which supports a primary or input shaft 4 in bearings 2 and 3. A coupling 5 is provided on the end of the input shaft 4 and a pair of input gear wheels 6 and 7 are solid with the input shaft 4. Input gear wheel 6 meshes with a first gear wheel 8 which is rotatably mounted on first countershaft 9 and is secured to and integral with a clutch drum 10. Clutch discs or plates 11 of suitable friction material or having facings of friction material are fitted inside the drum 10 so that they can slide axially but are restrained against rotation relative to the drum. Clutch plates 12 interleave with plates 11 and are mounted for rotation with a collar 13 but are axially slideable relative thereto. The collar 13 is rotatable in unison with shaft 9. A flange member 14 is also solid with shaft 9 and this acts as a piston in an annular cylinder 15, the latter being operative to move to the left and press the plates 11 and 12 together to drivingly unite gear 8 with shaft 9. The piston and cylinder constitute the clutch actuator. The cylinder 15 is moved axially against spring bias by feeding pressure fluid to the space between the flange 14 and the cylinder 15. The feed path is constituted by an axial passage 16 along the middle of shaft 9 and an intersecting radial passage 16a the fluid being delivered to this passage through an aperture 17 in the casing 1 which is aligned with an annular groove 18 in shaft 9 from which it enters passage 16 through a radial hole 16b. Spring 19 in compression between the piston and cylinder returns the cylinder and disengages the clutch when fluid pressure is removed. The cylinder 15 is provided with a constantly open restricting orifice to insure disengagement of the clutch when pressure is removed.

Figure 2:
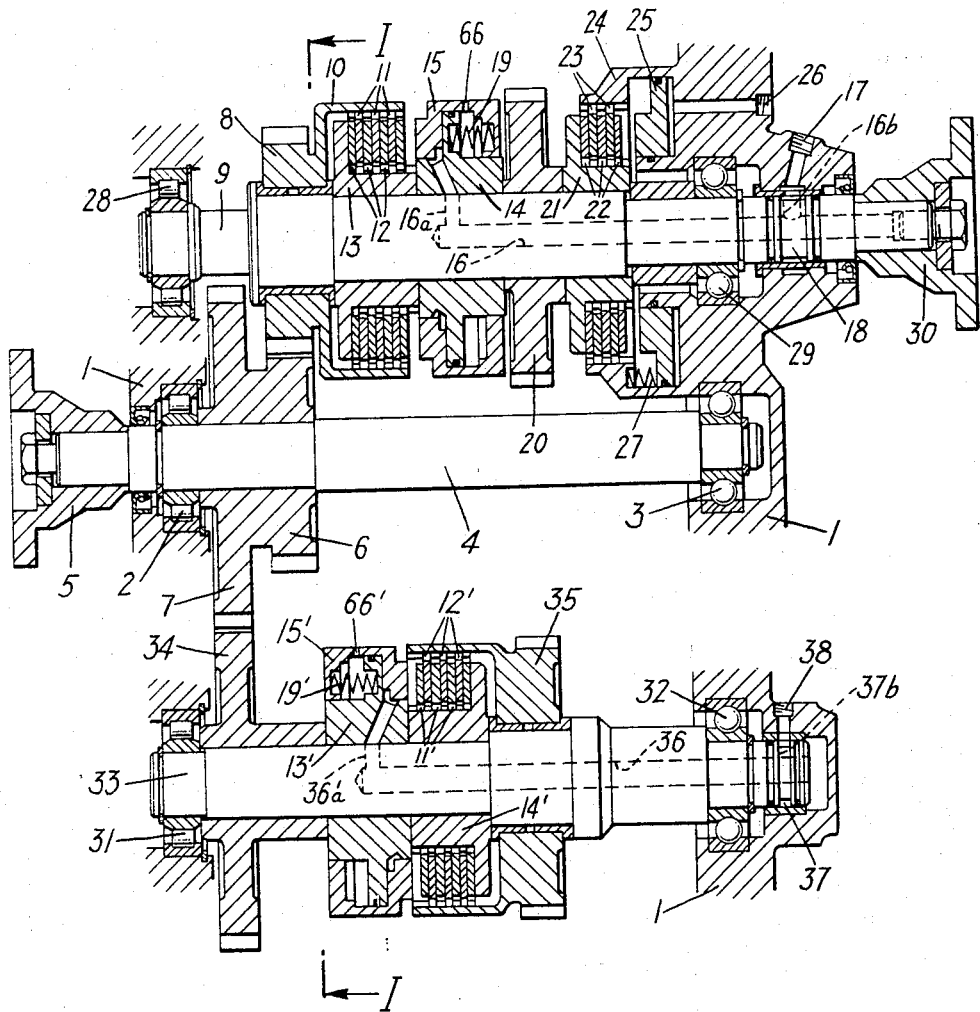
FIG. 2 shows the section 2—2 in FIG. 1.

Shaft 9 also carries a gear wheel 20 solid therewith, and a collar member 21. Plates 22 identical to plates 12 are non-rotatably supported on collar 21 and are permitted axial sliding movement relative thereto. Plates 23 identical to plates 11 are permitted to slide axially, but not circumferentially on a drum member 24 secured to or integral with the casing 1. The drum member 24 also constitutes a cylinder in which a piston 25 is fluid tightly slideable towards the left, as seen in FIG. 2, to press the plates 22 and 23 together against collar member 21. The collar member 21, plates 22 and 23 and drum 24 constitute a brake for shaft 9 and the piston 25 and cylinder constitute an actuator therefor.

The actuator is energized by pressure fluid introduced between the piston 25 and cylinder through passage 26 and the piston is returned by the action of a compression spring acting between it and the drum.

The first countershaft 9 is supported in bearing 28 and 29 and is provided with a coupling 30 which constitutes the output of the reversible gear.

The second countershaft 33 is supported on bearings 31 and 32 on the casing 1. Its relationship with the input shaft and the first countershaft is shown at FIG. 1. FIG. 1 also shows how input shaft 4 and input gear wheels 6 and 7 are common to a second reverser gear placed alongside the one now described. The second reverser gear elements which correspond are marked with a double suffix e.g., 4″. Secondary gear wheel 34 is keyed to shaft 33 and meshes with input gear wheel 7. A further gear wheel 35 rotatably mounted on shaft 33 meshes with gear 20 on first countershaft 9 and is capable of being coupled to second countershaft 33, by means of a clutch and clutch actuator similar to that already described with reference to the coupling of gear 8 with first countershaft 9. Accordingly, though the positions of the elements are presented in the opposite axial direction, they are identical in construction and operation to those already described and are therefore given identical reference numerals having a single suffix to distinguish them from their counterparts on shaft 9. The actuator for the second clutch is supplied with pressure fluid through radial passage 36a, axial passage 36, radial passage 36b and radial groove 37 in shaft 33 and aperture 38 in the casing 1.

It will be apparent that there is no functional reason why the brake should be mounted closely adjacent to gear 20 and in fact it could be mounted on the opposite side of the casing 1, on secondary countershaft 33 or on an extension of the output drive 30.

Figure 3:
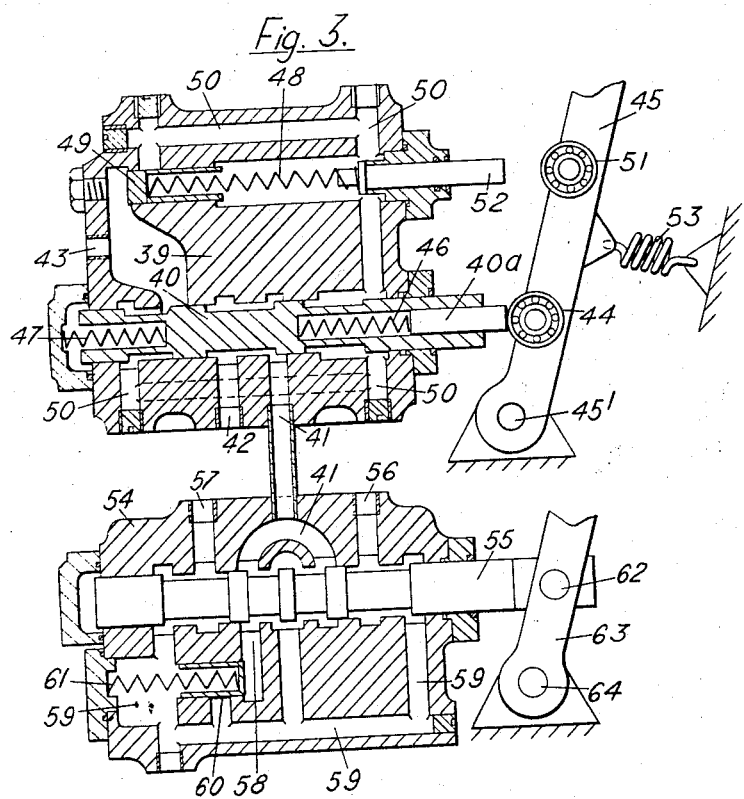
FIG. 3 is a cross section of the control valve means.
Figure 4:
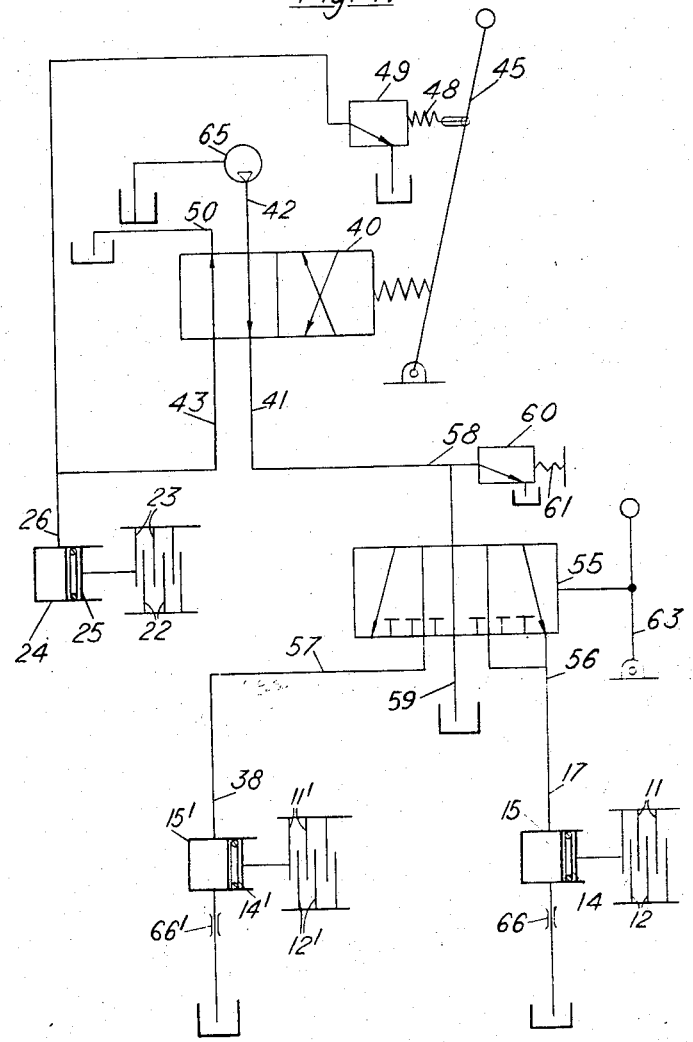
FIG. 4 is a diagram, using International Standard graphic Symbols, of the hydraulic circuit used in conjunction with the valve means.

The control of the reversible gear is effected by means of a valve means illustrated in FIGS. 3 and 4.

The valve means consists of a brake valve in which a distributor spool 40 slides. Four ports are provided on the brake valve; these are the clutch supply outlet port 41, the inlet port 42, the exhaust port 50 and the brake supply outlet port 43. When the spool is moved to the right as seen in the figure, ports 41 and 42 are in communication and pressure fluid is directed to the clutch valve which is to be described later. When it is moved to the left the passages 42 and 43 are connected and pressure fluid is diverted to energize the brake actuator, and the supply to the clutch is cut off.

The spool 40 is moved by the action of a roller bearing 44 mounted on a lever 45 pivoted about 45′. A spring 46 is interposed between the spool 40 and a plunger 40a held against the bearing 44. A return spring 47 acts on the spool to urge it to a "brakes off" position. Spring 46 is stronger than spring 47 for a reason which will be explained. A variable pressure relief valve is constituted by a plunger 49 exposed at its end to brake pressure and urged towards a closed position by a spring 48 placed between it and a plunger 52 protruding from the brake valve. The plunger is engageable by a second bearing 51 also mounted on lever 45. The operation of the brake valve is that on initial movement of the lever anti-clockwise the plunger 40a and spring 46 pushes the spool to the limit of leftwards travel in which position the pressure fluid is directed to the brake, but at very small pressure in view of the fact that the relief valve plunger will be open and pressure fluid will flow to exhaust passages 50. Further anti-clockwise movement of the lever is permitted by compression of spring 46 and bearing 51 moves plunger 52 to the left to compress the spring 48. Depending on the amount of anti-clockwise movement of lever 45 so the spring loading on plunger 49 is varied, thus causing the pressure at which the plunger 49 leaks fluid to be varied. The lever 45 therefore selects the braking condition and varies the pressure of fluid applied to the brake actuator, thus controlling the brake. The lever 45 is under constant bias to its rest position from spring 53.

Normally when the brakes are not applied the ports 41 and 42 are connected, thus channelling the pressure fluid flow to the clutch valve 54 through passage 41. The ports 43 and 50 are then in communication and the brake actuator is vented to exhaust.

The passage 41 divides into two within the clutch valve 54. A spool 55 connects passage 41 with passage 59 in its central position, with the first countershaft clutch actuator through passage 56 in its extreme leftward position and with the second countershaft clutch actuator through passage 57 in its extreme rightwards position. A pressure relief valve 60 biased by a spring 61 is placed in an extension 58 of passage 41. The spool 55 is operatively connected at 62 to a lever 63 pivoted to a fixed fulcrum 64. Thus when the lever 63 is moved anti-clockwise as seen in FIG. 3, the pressure fluid is directed to the forward clutch actuator and plates 11 and 12 are locked together and a drive forward results and when moved clockwise fluid is directed to the reverse clutch actuator and plates 11′ and 12′ are locked together and a reverse drive results.

The diagrammatic layout of the hydraulic circuits in FIG. 4 shows how the connections are made the reference numerals of the previous figures being used where possible to identify corresponding parts. The pressure source is represented as a pump 65 and the orifices 66 and 66′ on the clutch cylinders 15 and 15′ respectively are shown.

It will be apparent from a study of the proposed arrangement of gear wheels that the second countershaft 33 rotates in one sense when idling i.e., with its clutch disengaged, and in the opposite sense when its clutch is engaged. It follows that the thrusts between all meshing gear wheels are always acting on the same flank of the gear teeth even when there is a sudden reversal of drive through the reversible gear. Thus, even the presence of wear in the teeth does not induce any damaging vibration.

The operation of the reversible gear is particularly advantageous. By operating the lever 63 it is possible to reverse the rotation of the output immediately without shock and modulated braking is available as an overriding function without altering the setting of lever 63, the transmission automatically reverting to the former drive condition as soon as braking has ceased.

When both the left hand and right hand drive train control valves are supplied from a single fluid pressure source such as a common hydraulic pump, the actuation of the brake valve modulating means for one side of the vehicle automatically modulates the clutch pressure, be it forward or reverse, for the other side of the vehicle. This action produces a smooth transition from straight ahead to a turning condition. It furthermore produces a smooth transition from a turn being executed with one track merely braked to one with the same track being driven oppositely to its former direction of drive. Alternatively, if a more rigid control effect is desired, the left and right hand sides may each utilize a separate and independent source of pressure fluid.

Further pairs of countershafts can be driven either from the input shaft as seen in the ghost outline in FIG. 1 or by coupling other pairs of first and second countershafts to the first and second countershafts described above.

What is claimed is:

1. A vehicle transmission including a reversible gear comprising a forward drive train and a reverse drive train having a common power input and a common power output, said forward drive train including a first fluid pressure actuated clutch, said reverse drive train including a second fluid pressure actuated clutch, a fluid pressure actuated brake operable on said common output, means forming a source of pressure fluid, first valve means selectively operable to supply fluid from the source either to the brake at modulated variable pressure or to second valve means selectively operable to direct fluid to either the first or second clutch, or to neither.

2. A vehicle transmission as claimed in claim 1 wherein the first valve means includes a spring-controlled pressure relief valve and means for manually varying the spring force applied to the relief valve.

3. A vehicle transmission as claimed in claim 2 and a common manual actuator for varying the spring force applied to the relief valve and for selecting the supply of fluid to either the brake or the second valve means.

4. A vehicle transmission including an input shaft, an output sahft, a forward drive from between said input shaft and said output shaft including a pair of gears in series with a first fluid pressure operated clutch, a reverse drive train between said input shaft and said output shaft including two pairs of gears in series with a second fluid pressure operated clutch, a fluid pressure actuated brake operable on said output shaft to retard the same, means forming a source of fluid under pressure first valve means selectively operable to supply fluid from said source either to the brake at modulated pressure levels or to second valve means selectively operable to direct fluid to either the first or the second clutch, said first valve means having a passage leading from the source to the second valve and constituting the sole path for pressure fluid to reach the second valve and the clutches, said first valve means including a spring-controlled pressure relief valve and means for manually varying the spring force applied to the relief valve, and a common manual actuator for varying the spring force applied and for selecting the supply of fluid to either the brake or said second valve means.

References Cited

UNITED STATES PATENTS

| | | | |
|---|---|---|---|
| 2,050,520 | 8/1936 | Carter | 192—12.1 |
| 2,725,890 | 12/1955 | Kanuch | 192—12.1 |
| 3,149,498 | 9/1964 | Mack | 192—12.1 XR |
| 3,177,994 | 4/1965 | Jewson | 192—18.1 |
| 3,216,541 | 11/1965 | Steffen | 192—12.1 |
| 3,321,054 | 5/1967 | Johson et al. | 192—4 |

BENJAMIN W. WYCHE III, *Primary Examiner.*

U.S. Cl. X.R.

192—15, 18; 74—411.5

PO-1050
(5/69)

UNITED STATES PATENT OFFICE
CERTIFICATE OF CORRECTION

Patent No. 3,441,114         Dated April 29, 1969

Inventor(s)  Pietro Pensa

It is certified that error appears in the above-identified patent and that said Letters Patent are hereby corrected as shown below:

In the drawings, sheet 4, Fig. 4, the attachment of lines 56 and 57 to valve 55 are incorrectly shown, and should appear as follows:

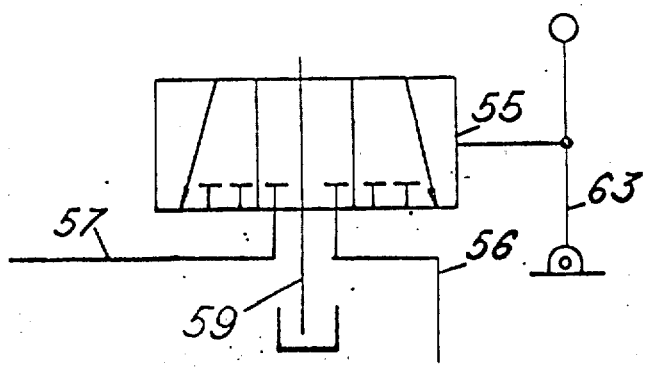

SIGNED AND
SEALED
APR 14 1970

(SEAL)
Attest:

Edward M. Fletcher, Jr.
Attesting Officer

WILLIAM E. SCHUYLER, JR.
Commissioner of Patents